(12) United States Patent
Doepke et al.

(10) Patent No.: US 9,749,524 B1
(45) Date of Patent: Aug. 29, 2017

(54) METHODS AND SYSTEMS FOR DETERMINING A DIRECTION OF A SWEEP MOTION

(75) Inventors: Frank Doepke, San Jose, CA (US); Marco Zuliani, Los Gatos, CA (US)

(73) Assignee: Apple Inc., Cupertino, CA (US)

( * ) Notice: Subject to any disclaimer, the term of this patent is extended or adjusted under 35 U.S.C. 154(b) by 641 days.

(21) Appl. No.: 13/481,628

(22) Filed: May 25, 2012

(51) Int. Cl.
*A63J 13/00* (2006.01)
*H04N 5/232* (2006.01)

(52) U.S. Cl.
CPC .............................. *H04N 5/23238* (2013.01)

(58) Field of Classification Search
USPC ....................................................... 348/36–39
See application file for complete search history.

(56) References Cited

U.S. PATENT DOCUMENTS

| | | | | |
|---|---|---|---|---|
| 7,646,932 B1* | 1/2010 | Peterson | ............... | G06T 3/4038 345/629 |
| 8,587,636 B2* | 11/2013 | Kimura | .................. | H04N 5/232 348/222.1 |
| 8,730,322 B2* | 5/2014 | Rondinelli | ..................... | 348/143 |
| 2004/0001138 A1* | 1/2004 | Weerashinghe et al. | ........ | 348/36 |
| 2007/0206945 A1* | 9/2007 | DeLorme | ............... | G03B 41/00 396/332 |
| 2009/0021576 A1 | 1/2009 | Linder et al. | | |
| 2009/0022422 A1 | 1/2009 | Sorek et al. | | |
| 2009/0028462 A1 | 1/2009 | Habuka et al. | | |
| 2009/0290013 A1* | 11/2009 | Hayashi | ................. | H04N 5/232 348/36 |
| 2011/0149016 A1* | 6/2011 | Kimura | .................. | H04N 5/232 348/36 |
| 2011/0158556 A1* | 6/2011 | Oda | .............................. | 382/286 |
| 2012/0019614 A1 | 1/2012 | Murray et al. | | |

FOREIGN PATENT DOCUMENTS

| | | | |
|---|---|---|---|
| JP | 01284916 A | * | 11/1989 |
| WO | WO-00/34803 | | 6/2000 |

OTHER PUBLICATIONS

Zhang et al. "Continuous functional activity monitoring based on wearable tri-axial accelerometer and gyroscope." 2011 5th International Conference on Pervasive Computing Technologies for Healthcare (PervasiveHealth) and Workshops. IEEE, 2011.*
Adorama, Sony Announces Five Cameras with Sweep Panorama, http://www.adorama.com/alc/0012191/blogarticle/Sony-announces-five-cameras-with-sweep-panorama, Jan. 7, 2010, 3 pages.
Grayson, Matt, Photography Blog, Nikon Coolpix S6300 Review, http://www.photographyblog.com/reviews/nikon_coolpix_s6300_review/, Aug. 27, 2012, 5 pages.

* cited by examiner

*Primary Examiner* — William C Vaughn, Jr.
*Assistant Examiner* — Stuart Bennett
(74) *Attorney, Agent, or Firm* — Blakely, Sokoloff, Taylor & Zafman LLP (57) ABSTRACT

In one embodiment, an image-capturing device includes a camera, one or more motion-estimating devices to detect motion data for the device, and a processing system which is configured to automatically estimate a first direction of a sweep motion of the image-capturing device based on the motion data. The processing system is further configured to automatically estimate a second direction of the sweep motion of the image-capturing device based on images captured by the image-capturing device and to automatically select the first direction or the second direction of the sweep motion.

16 Claims, 8 Drawing Sheets

METHODS AND SYSTEMS FOR DETERMINING A DIRECTION OF A SWEEP MOTION

Embodiments of the invention are generally related to methods and systems for automatically determining a direction of a sweep motion of an image-capturing device.

BACKGROUND

Image-capturing devices include cameras, portable handheld electronic devices, and other electronic devices. The images captured by image-capturing devices can be constructed by an application to create a panorama. The application needs to know a direction of a sweep motion of the image-capturing device to determine the panorama. One prior approach requires user input for determining the direction. This approach can frustrate a user experience and clutter a user interface due to the required user input for determining the direction.

SUMMARY

Several methods, devices and systems for determining a direction of a sweep motion are described. In one embodiment, an image-capturing device includes a camera and one or more motion-estimating devices. The image-capturing device is designed to determine a direction of a sweep motion of the device based on motion data. The image-capturing device includes one or more motion-estimating devices to detect motion data for the image-capturing device and a processing system which is configured to automatically estimate a first direction of a sweep motion of the image-capturing device based on the motion data. The processing system is configured to automatically estimate a second direction of the sweep motion of the image-capturing device based on images captured by the image-capturing device and to automatically select the first direction or the second direction of the sweep motion. The processing system is further configured to determine a first confidence level associated with the first direction and to determine a second confidence level associated with the second direction. The processing system is further configured to compare the first confidence level and the first direction with the second confidence level and the second direction. The processing system is further configured to select either the first or second direction based on the comparison.

In another embodiment, a computer readable medium contains executable computer program instructions (e.g., modules 1037-1039) which when executed by the data processing system 1000 cause said system to perform a method. The method initiates a panoramic mode for an image-capturing device, captures images with the image-capturing device, and automatically determining a sweep direction of a sweep motion of the image-capturing device. The image-capturing device automatically acquires motion data from motion sensors. The image-capturing device automatically constructs a sweep evidence function, which is used to compute a strength of the sweep motion from sensor values of motion sensors over a period of time. The image-capturing device automatically associates the sweep evidence function to the values coming from motion sensors including an angular evidence function being associated with values from a gyroscope and a linear acceleration evidence function being associated with values from an accelerometer. The image-capturing device automatically determines a direction of sweep motion based on the angular evidence function and the acceleration evidence function.

Other embodiments are also described. Other features of the present invention will be apparent from the accompanying drawings and from the detailed description which follows.

BRIEF DESCRIPTION OF THE DRAWINGS

The embodiments of the invention are illustrated by way of example and not by way of limitation in the figures of the accompanying drawings in which like references indicate similar elements. It should be noted that references to "an" or "one" embodiment of the invention in this disclosure are not necessarily to the same embodiment, and they mean at least one.

DETAILED DESCRIPTION

Several methods, devices and systems for automatically determining a direction of a sweep motion are described. In one embodiment, a method enhances a user experience for panorama applications and other applications (e.g., gaming applications, collaborative applications) by automatically identifying a directionality of a sweep motion performed by a user holding an image-capturing system. The sweep motion is identified by utilizing data provided by motion sensors in the system.

Figure 1:
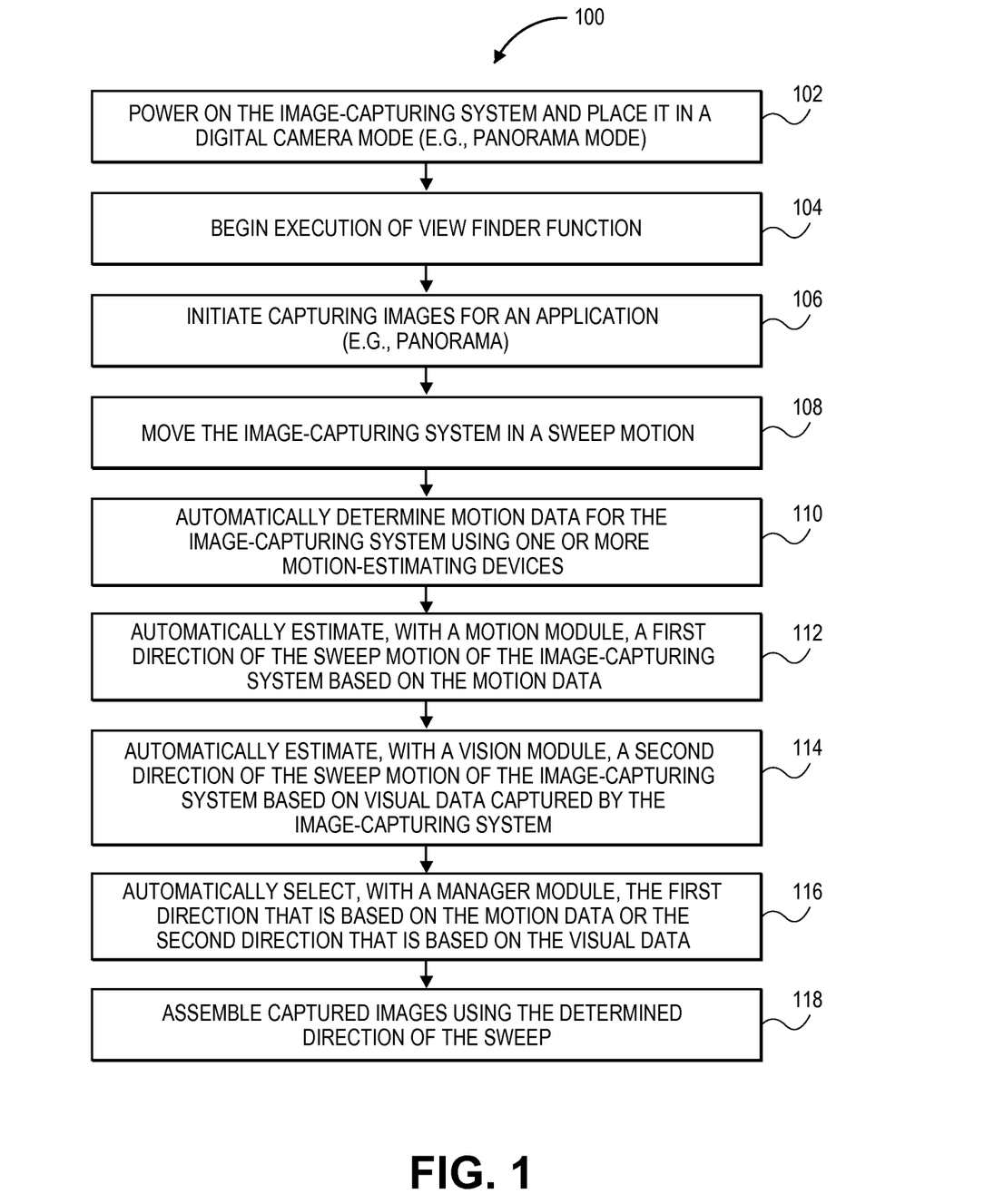
FIG. 1 illustrates a flow diagram in one embodiment of the present invention for a computer-implemented method 100 of automatically determining a direction of a sweep motion during capture of images (e.g., sequence of images, video) with an image-capturing system.

FIG. 1 illustrates a flow diagram in one embodiment of the present invention for a computer-implemented method 100 of automatically determining a direction of a sweep motion during capture of images (e.g., sequence of images, video) with an image-capturing system. The computer-implemented method 100 is performed by processing logic that may comprise hardware (circuitry, dedicated logic, etc.), software (such as is run on a general purpose computer system or a dedicated machine or a system), or a combination of both. The processing logic sends information to and receives information from an image sensing unit having a microprocessor and image sensors. The processing logic sends information to and receives information from a motion sensing unit having a microprocessor and motion sensors.

After powering on the image-capturing system and placing it in a digital camera mode (e.g., panorama mode) at block 102, a view finder function begins execution which displays still images or video (e.g., a series of images) of a subject, object, or scene that is in view of an image-capturing device (e.g., camera lens) of the system at block 104. The user aims the camera lens so that a desired portion of the scene appears on the preview portion of the screen of the system. A default autofocus mode may be initiated by the processing logic once the camera is placed in the digital camera mode. At block 106, processing logic initiates capturing images for an application (e.g., panorama, gaming) by pressing a soft button, physical button, or voice triggered by the user. A panorama application may capture a sequence of images to form one or more panoramic wide-angled images. At block 108, the user moves the image-capturing system in a sweep motion with a direction (e.g., left to right, right to left, higher to lower, lower to higher, etc.). At block 110, the processing logic (e.g., one or more processing units) automatically determines motion data for the image-capturing system using one or more motion-estimating devices. The motion data is associated with images captured during the intended sweep motion. At block 112, the processing logic automatically estimates, with a motion module, a first direction of the sweep motion of the image-capturing system based on the motion data. At block 114, the processing logic automatically estimates, with a vision module, a second direction of the sweep motion of the image-capturing system based on visual data captured by the image-capturing system. The visual data is associated with images captured during the intended sweep motion. At block 116, the processing logic automatically selects, with a manager module, the first direction that is based on the motion data or the second direction that is based on the visual data as will be discussed in more detail in conjunction with FIG. 4. At block 118, the processing logic assembles captured images using the determined direction of the sweep. The assembled images may be used to generate one or more panoramic images. Alternatively, the determined direction of the sweep motion may be used for different gaming applications. The one or more motion-estimating devices include a gyroscope, an accelerometer, or any combination thereof in single or multi physical packages. The vision module may be associated with an image-capturing device (e.g., digital camera). The vision module may use a sequence of images captured by the image-capturing device to identify motion during the sweep motion. The motion module is decoupled from the vision module with the modules asynchronously providing data to a manager module that determines the first and the second directions of the sweep motion and the first and second confidence levels automatically without user input. For example, the motion module may receive input data from motion sensors at a frequency of 100 hertz while the vision module may receive input data from the image-capturing device at a frequency of 15 or 20 hertz. The direction of the sweep motion is with respect to a canonical coordinate system associated with the image-capturing system.

Figure 2:
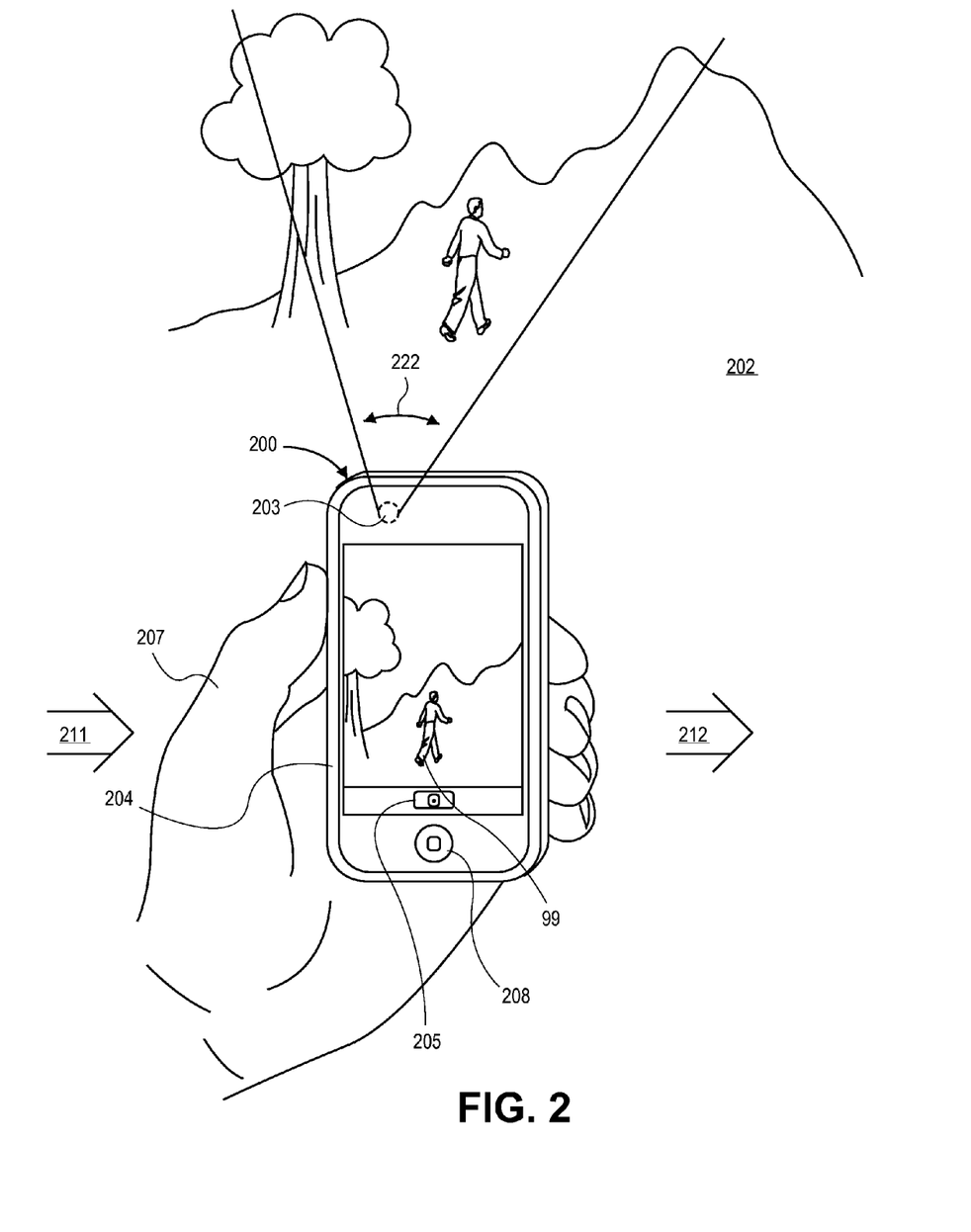
FIG. 2 shows an image-capturing system 200, which can be a portable handheld electronic device, having a built-in digital camera and a touch sensitive screen 204 in the hand of its user, undergoing a left to right sweep motion during an image capture process.

FIG. 2 shows an image-capturing system 200, which can be a portable handheld electronic device, having a built-in digital camera and a touch sensitive screen 104 in the hand 207 of its user, undergoing a left to right sweep motion indicated by the arrows 211 and 212 during an image capture process. The system 200 or device may be an IPHONE® device by Apple Inc., of Cupertino, Calif. Alternatively, it could be any other portable handheld electronic device that has a built-in digital camera. The built-in digital camera includes a lens 203 located in this example on the back face of the system 200. The lens may be a fixed optical lens system or it may have focus and optical zoom capability. Although not depicted in FIG. 2, inside the system 200 are an electronic image sensor and associated hardware circuitry and running software that can capture digital images or video of a scene 202 that is in view of the lens 203.

The digital camera functionality of the system 200 includes an electronic or digital viewfinder. The viewfinder displays live, captured video (e.g., series of images) or still images of the scene 202 that is before the camera, on a portion of the touch sensitive screen 204 as shown. In this case, the digital camera also includes a soft or virtual shutter button whose icon 205 is displayed by the screen 204, directly below the viewfinder image area. As an alternative or in addition, a physical shutter button may be implemented in the system 200. In one embodiment, the system 200 may be placed in either the digital camera mode (e.g., panorama mode) or the mobile telephone mode, in response to, for example, the user actuating a physical menu button 208 and then selecting an appropriate icon on the touch sensitive screen 204. The system 200 includes all of the needed circuitry and/or software for implementing the digital camera functions of the electronic viewfinder, shutter release, and automatic determination of a direction of a sweep motion while in panorama mode as described below.

A user can perform a sweep motion of the system 200 by moving the system from left to right as illustrated in FIG. 2. The system 200 captures a series of images that correspond to different portions (e.g., 222) of the scene. The panorama application can then assemble these images to generate one or more panoramic images of the scene as discussed in the method 100.

Figure 3:
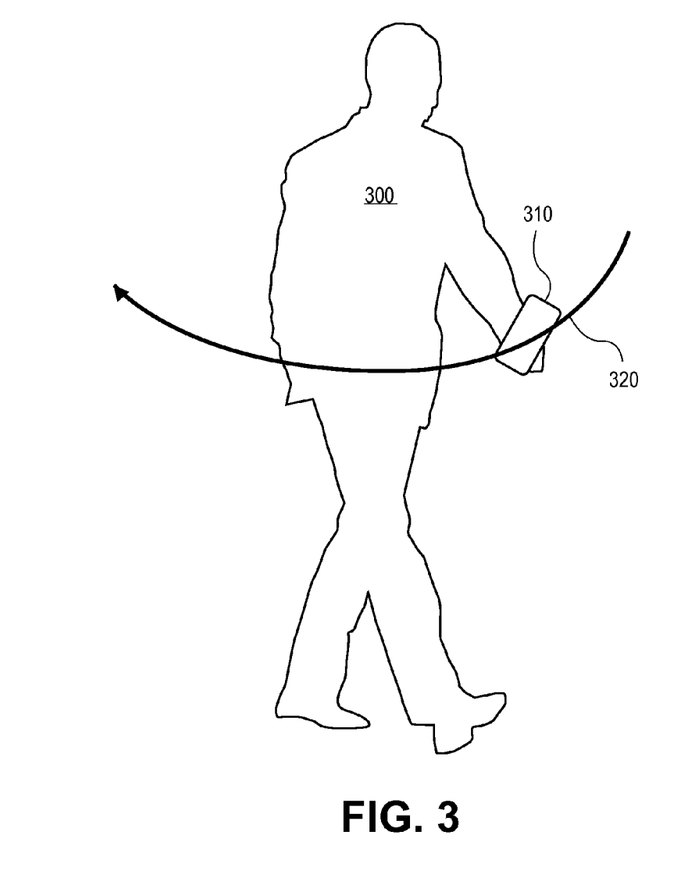
FIGS. 3 and 4 illustrate examples of a sweep motion in accordance with one embodiment of the invention.
Figure 4:
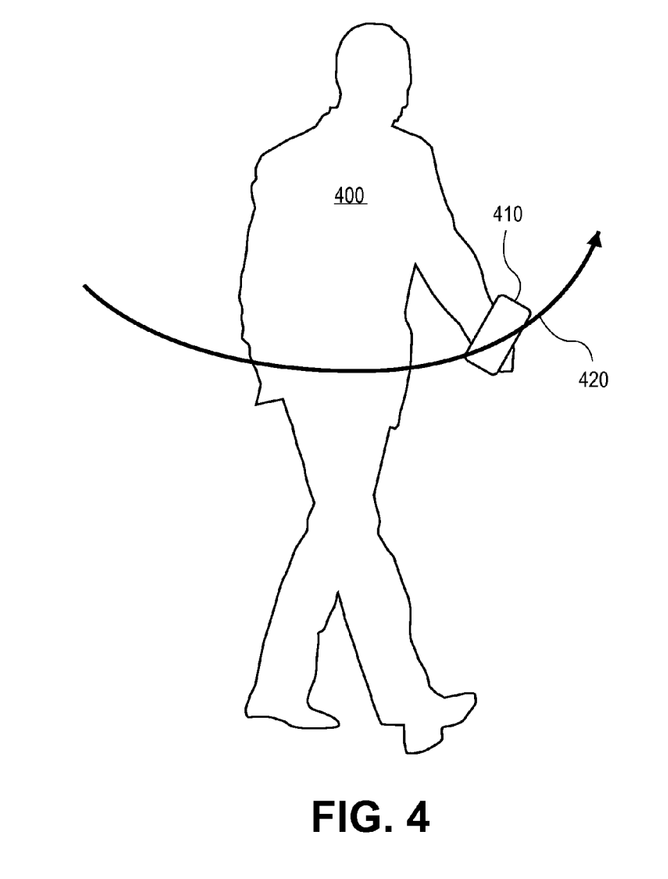

FIGS. 3 and 4 illustrate examples of a sweep motion in accordance with one embodiment of the invention. FIG. 3 illustrates a user 300 that moves the system 310 with a left to right direction of a sweep motion 320. FIG. 4 illustrates a user 400 that moves the system 410 with a right to left direction of a sweep motion 420.

Figure 5:
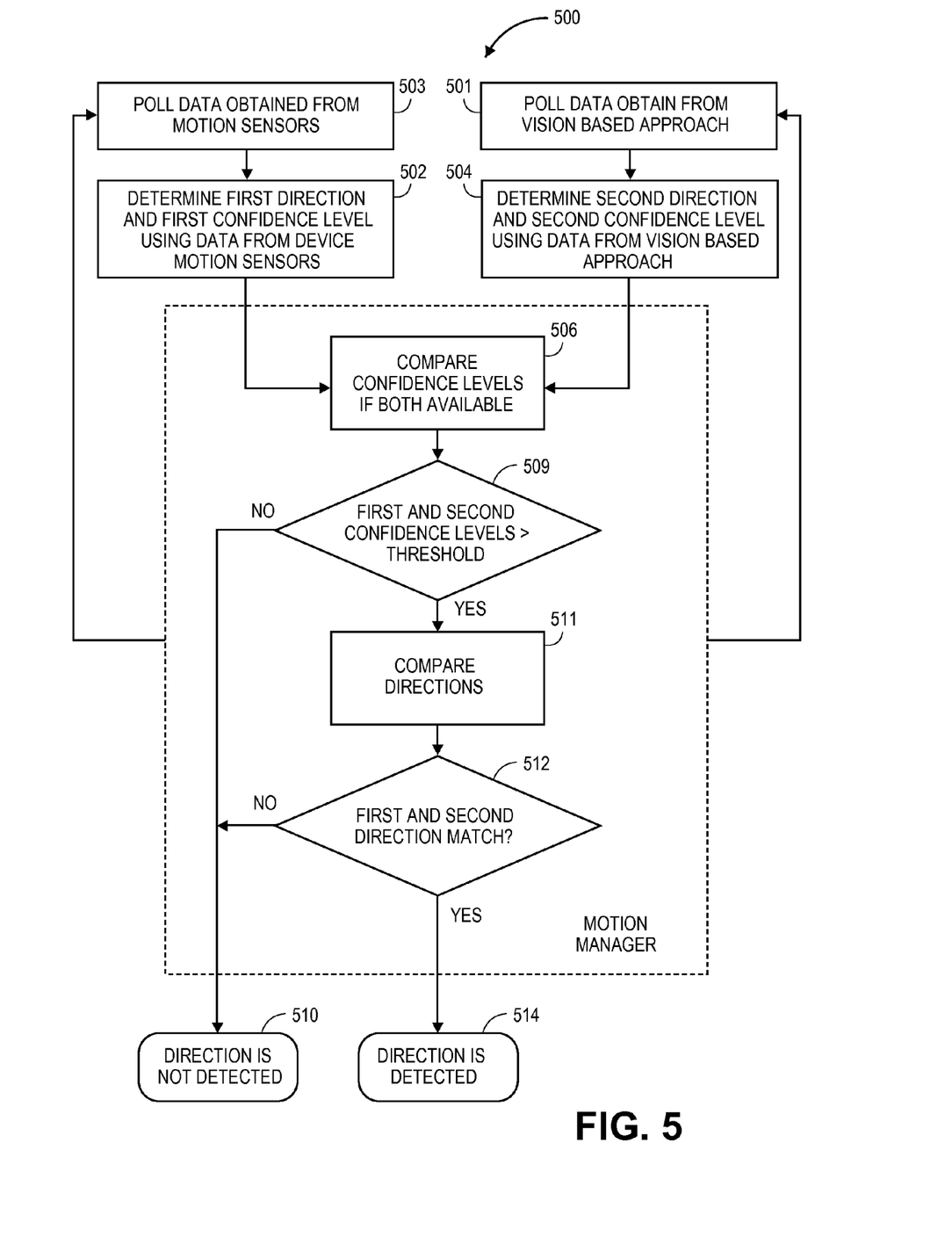
FIG. 5 illustrates a flow diagram in one embodiment of the present invention for a computer-implemented method 500 of automatically selecting a direction of a sweep motion during capture of images (e.g., sequence of images, video) with an image-capturing system.

FIG. 5 illustrates a flow diagram in one embodiment of the present invention for a computer-implemented method 500 of automatically selecting a direction of a sweep motion during capture of images (e.g., sequence of images, video) with an image-capturing system. The computer-implemented method 500 is performed by processing logic that may comprise hardware (circuitry, dedicated logic, etc.), software (such as is run on a general purpose computer system or a dedicated machine or a system), or a combination of both.

For the method 500, at least some of the operations of the method 100 are performed. Processing logic that is associated with a motion manager module polls data obtained from motion sensors of the image-capturing system at block 503. At block 502, processing logic uses this data to automatically estimate, with a motion module, a first direction of the sweep motion of the image-capturing system and a first confidence level or quality factor based on motion data. Processing logic that is associated with the motion manager module polls data obtained from vision based approach of the image-capturing system at block 501. At block 504, processing logic uses this data to automatically estimates, with a vision module, a second direction of the sweep motion of the image-capturing system and a second confidence level or quality factor. The data may be visual data captured by the image-capturing system. A confidence level indicates a level of confidence regarding a determined direction being an actual direction of the sweep motion. The vision module may use a sequence of images captured by the image-capturing device to identify motion during the sweep motion. The second confidence level may be based on a registration between two images. A certain part of a first image may not agree with a certain part of a second image. At block 506, the processing logic compares the first confidence level with the second confidence level if both are available. The motion manager controls the motion module and the vision module. The motion manager asynchronously polls the data from the motion sensors and vision based approach and compares the values if both are available. For example, the motion sensors may provide data to the motion manager at a first frequency (e.g., 100 hertz) while a camera provides data to the motion manager at a second frequency (e.g., 15-20 hertz). At block 509, the processing logic determines if the first and second confidence levels exceed a threshold. The threshold may be determined empirically. At block 510, the direction is not detected if the first and second confidence levels do not exceed the threshold. At block 511, the processing logic compares the first direction to the second direction if the confidence levels exceed the threshold at block 509. At block 512, the processing logic determines if the first direction matches the second direction. At block 510, the processing logic fails to detect a direction if the first and second directions do not match. At block 514, the processing logic detects a direction if the first and second directions match at block 512.

Figure 6:
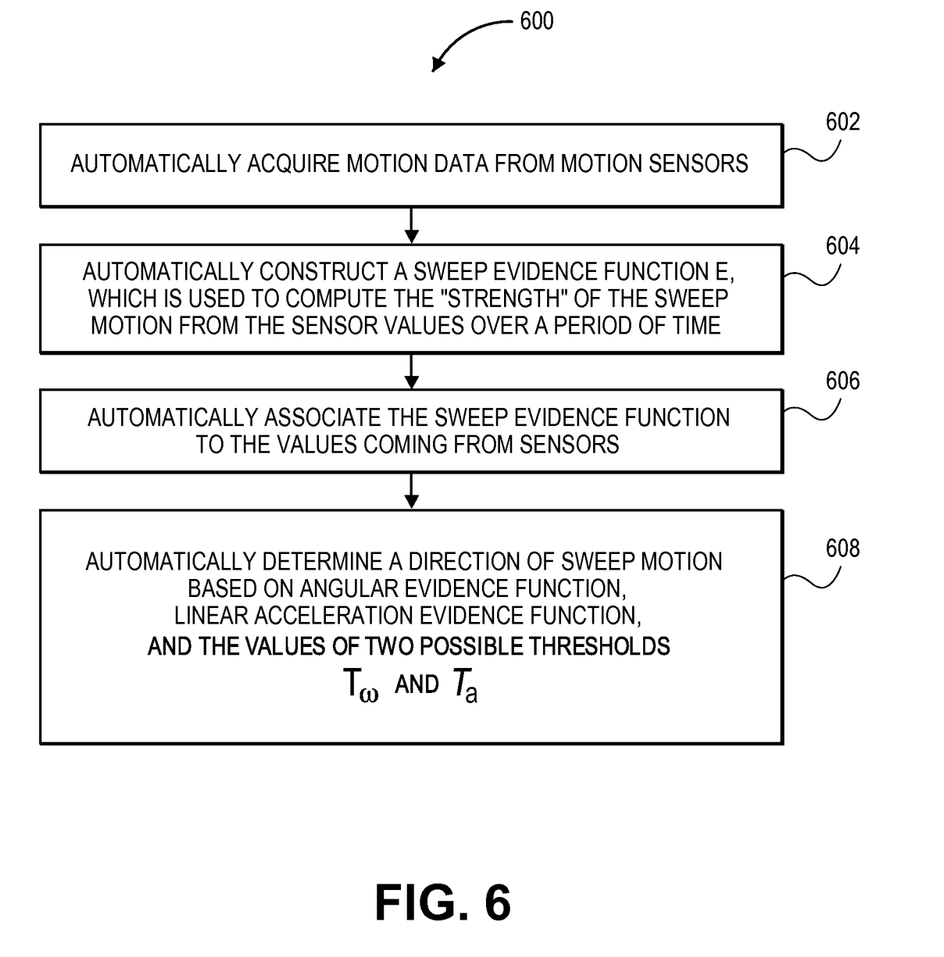
FIG. 6 illustrates a flow diagram in one embodiment of the present invention for a computer-implemented method 600 of automatically determining a direction of a sweep motion during capture of images (e.g., sequence of images, video) with an image-capturing system.

FIG. 6 illustrates a flow diagram in one embodiment of the present invention for a computer-implemented method 600 of automatically determining a direction of a sweep motion during capture of images (e.g., sequence of images, video) with an image-capturing system. The computer-implemented method 600 is performed by processing logic that may comprise hardware (circuitry, dedicated logic, etc.), software (such as is run on a general purpose computer system or a dedicated machine or a system), or a combination of both. The processing logic sends information to and receives information from an image sensing unit having a microprocessor and image sensors. The processing logic sends information to and receives information from a motion sensing unit having a microprocessor and motion sensors.

The purpose of the algorithm associated with the method 600 is to automatically identify the directionality of a sweep motion performed by a person holding an image-capturing system (e.g., iPhone) in front of her/him utilizing the data produced by the motion sensors in the image-capturing system (e.g., gyroscope and the accelerometers). This algorithm will provide the panorama application with the information regarding the directionality of the sweep which can be, for example, left-to-right or right-to-left with respect to the canonical coordinate system associated with the image-capturing system. Such information is crucial in order to produce seamless and geometrically consistent panoramas within real time constraints.

At block 602, the processing logic automatically acquires motion data from motion sensors. At block 604, the processing logic automatically constructs a sweep evidence function E, which is used to compute the "strength" of the sweep motion from the sensor values over a period of time.

Every time the motion sensor (e.g., either the accelerometer or the gyroscope) produces a new sample s(n), two quantities are updated:

$$L(n) \doteq \begin{cases} L^{(n-1)} + s^{(n)} & \text{if } s^{(n)} \geq 0, \\ 0 & \text{otherwise} \end{cases} \quad (1)$$

and:

$$R(n) \doteq \begin{cases} R^{(n-1)} - s^{(n)} & \text{if } s^{(n)} < 0, \\ 0 & \text{otherwise} \end{cases} \quad (2)$$

The superscript $^{(n)}$ indicates that a certain quantity is associated to the iteration or to the time instant n. Initially L and R are initialized to zero. These two quantities act as discrete integrators of the positive and the negative part of the sensor readings along time. Note that L and R are always positive. Utilizing L and R, a new quantity, the sweep evidence function, is computed:

$$E^{(n)} \doteq \frac{L^{(n)} - R^{(n)}}{L^{(n)} + R^{(n)} + \varepsilon} \quad (3)$$

The sweep evidence function has the following properties:

Suppose $R^{(n)} = \alpha L^{(n)}$. Then, when the value of R dominates the value of L:

$$\lim_{\alpha \to \infty} E^{(n)} = \lim_{\alpha \to \infty} \frac{L^{(n)}(1 - \alpha)}{L^{(n)}(1 + \alpha)}$$

Similarly, suppose $L^{(n)} = \alpha R^{(n)}$. Then, when the value of L dominates the value of R:

$$\lim_{\alpha \to \infty} E^{(n)} = \lim_{\alpha \to \infty} \frac{R^{(n)}(\alpha - 1)}{R^{(n)}(\alpha + 1)}$$

Therefore, the algorithm can conclude that the value of E(n) belongs to the interval [−1; 1] for every n.

If $L^{(n)} \approx R^{(n)}$, then $E^{(n)} \approx 0$.

If $s^{(n)} \geq 0$ for every n, then $R^{(n)} = 0$ for every n and consequently $E^{(n)}$ remains identically equal to 1. Vice versa, when $s^{(n)} < 0$ for every n, $E^{(n)}$ remains identically equal to −1. Note that if $s^{(n)}$ is identically equal to zero as well, the value of $E^{(n)}$ remains equal to zero (thanks to the small constant E that guards against a singular denominator).

The sweep evidence function is invariant with respect to a scaling of the sensor values. This means that the sequences $\{s^{(i)}\}_{1 \leq i \leq n}$ and $\{\alpha s^{(n)}\}_{1 \leq i \leq n}$ produce the same values for $E^{(n)}$. Note that the invariance of the sweep evidence function to scalings of the sensor values is not necessarily a desirable property, since sensor values that have a small magnitude will have the same effect of large magnitude ones. Moreover, the evidence function may abruptly jump to one or negative one as soon as the first sensor value is available.

At block 606, the processing logic automatically associates the sweep evidence function to the values coming from two sensors. From the gyroscope: the angular evidence function ($E_\omega$) is computed from $s^{(n)}=\omega_y^{(n)}$, i.e. from the angular velocity measured along the phone "vertical axis." From the accelerometer: the linear acceleration evidence function ($E_\alpha$) is computed from $s^{(n)}=a_x^{(n)}$, i.e. from the linear acceleration measured along the phone "horizontal axis". The variables $\omega_x$, $\omega_y$, and $\omega_z$ indicate the angular velocity along the axes of the device. The variables $a_x$, $a_y$, and $a_z$ indicate the linear acceleration along the axes of the device. At block 608, the processing logic automatically determines a direction of sweep motion based on $E_\omega^{(n)}$ and $E_a^{(n)}$ and the values of two positive thresholds $T\omega$ and $Ta$:

Sweep direction =  (4)

$$\begin{cases} \text{Left to right if } (E_\omega^{(n)} \leq -T_\omega) \text{ or } (E_a^{(n)} \leq -T_a), \\ \text{Undecide if } (-T_\omega < E_\omega^{(n)} < T_\omega) \text{ and } (-T_a < E_a^{(n)} < T_a), \\ \text{Right to left if } (E_\omega^{(n)} \geq T_\omega) \text{ or } (E_a^{(n)} \geq T_a) \end{cases}$$

Figure 7:
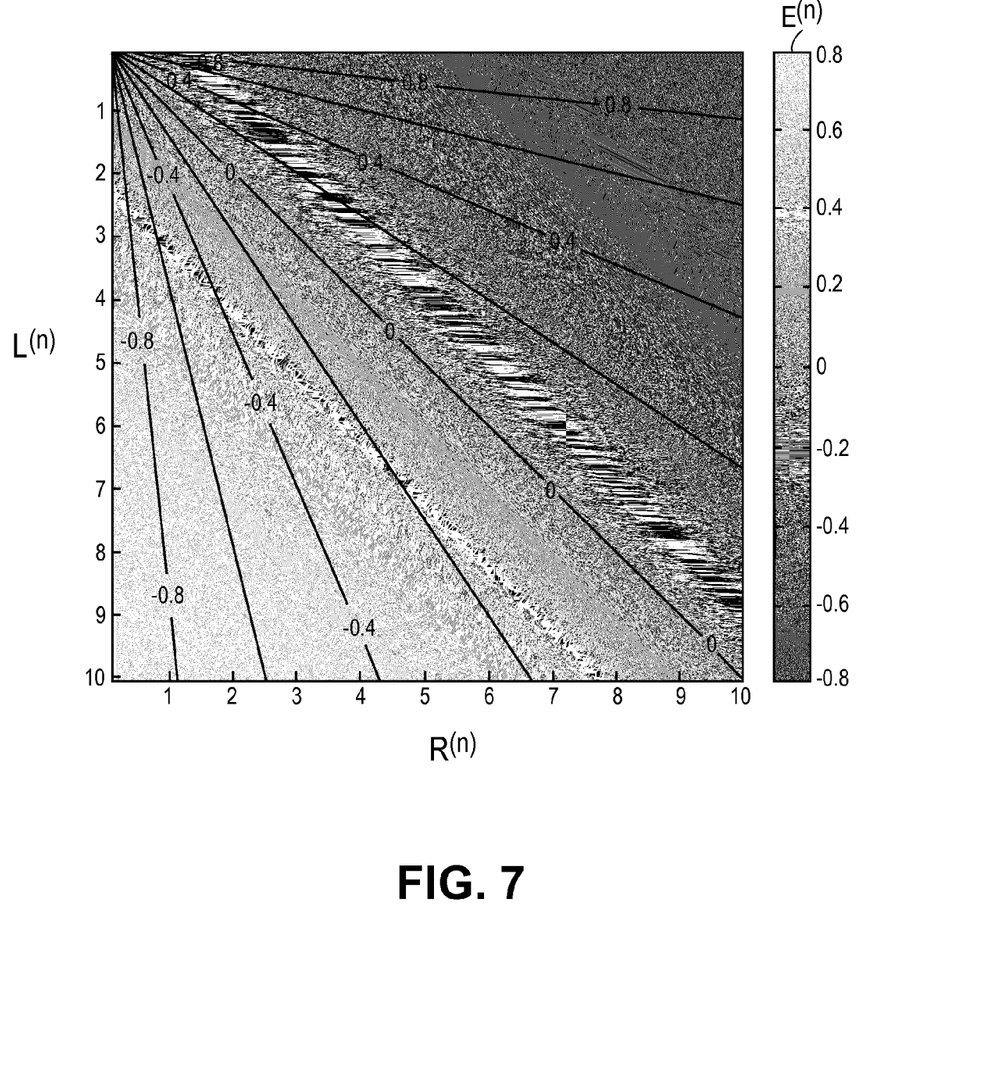
FIG. 7 displays the value of the sweep evidence function $E^{(n)}$ on a right axis as a function of the integrators $L^{(n)}$ and $R^{(n)}$ in accordance with one embodiment of the present invention.

In other words, the final decision is made when one of the two evidence functions exceeds the corresponding threshold value. The choice for the correct value for the threshold is mostly done experimentally with the help of the illustration in FIG. 7 in accordance with one embodiment of the present invention, which displays the value of the sweep evidence function $E^{(n)}$ on a right axis as a function of the integrators $L^{(n)}$ and $R^{(n)}$. The ratio between $L^{(n)}$ and $R^{(n)}$ ranges in the interval [0.1, 10]. The two positive thresholds $T\omega$ and $Ta$ may have positive values between 0 and 1. For example, $T\omega$ may have a values of 0.8 and $Ta$ may have a value 0.5.

Sensor noise characterization is performed by calculating sensors values for the gyroscope and accelerometer when the system is at rest. The values can be collected at a certain frequency (e.g., 100 hertz) and concatenate three acquisitions of a certain time period (e.g., 10 seconds each). For each acquisition by the motion sensors, the y axis of the system is approximately aligned with the three axis of a coordinate system that had one axis aligned with gravitational acceleration. The algorithm rejects all the sensor readings that do not meet the following condition:

$$|s^{(n)}-\mu| \geq N_{std\sigma}$$

where $\mu$ and $\sigma$ are respectively the mean and the standard deviation of the sensor values when the system is at rest.

The sweep detector must cope with two contrasting goals in order to provide a satisfactory user experience:
1. The detection should happen as quickly as possible, so that the panorama starts being assembled from a frame that is as close as possible to the one visible in the view finder when the sweep detector was triggered.
2. The detector should be able to ignore undesired motions and jitter of the system.

Lowering the value of the thresholds $T\omega$ and $Ta$ allows an increase in the responsiveness of the detector but, at the same time, the estimation process becomes more affected by motion noise.

The algorithm integrates the values of L and R for a few samples before making any decision. This is important, since after receiving the first angular velocity sample $\omega_y^{(1)}$ the value of $E^{(1)}$ will jump to $-1$ or $1$, that is to a value larger than the threshold $T\omega$ (and thus avoiding the undecided zone even if the algorithm collects negligible evidence for the direction of the sweep). Similar considerations hold for the acceleration. Thus, the algorithm makes a decision based on $E^{(n)}$ only after the algorithm receives a few samples, when $n \geq n_{min}=[\tau_{min}F]$, where $\tau_{min}$ is the minimum integration time.

Moreover, if the sweep detector is triggered by a tap on the device screen, it seems wise to discard the initial sensor readings because these readings are likely to be affected by the tap itself. Thus, the algorithm starts integrating the sensor values for $n \geq n_{skip}=[\tau_{skip}F]$.

Before integrating the values of the angular velocity and of the linear acceleration along the y axis, it may be advisable to filter out values that are collected during unclear motion conditions. To achieve this goal, the algorithm compares the three components of the angular velocities and of the linear accelerations. To consider a sample at time n relevant for integration, the algorithm determines that the angular velocity along the y axis is more prominent (dominant rotation) than the angular velocity along the other axis:

Sample $\omega_y$ is relevant $\Leftrightarrow (M_\omega|\omega_y|>|\omega_x|) \wedge (M_\omega|\omega_y|>|\omega_z|)$  (6)

To consider a sample at time n relevant for integration, the algorithm determines that that the linear acceleration along the x axis is more prominent (dominant acceleration) than the linear acceleration along the other axis:

Sample $a_x$ is relevant $\Leftrightarrow (M_a|a_x|>|a_y|) \wedge (M_a|a_x|>|a_z|)$  (7)

If the sample does not meet the requirements for integration, then the algorithm dampens the value of the evidence by a value $w_d$ (e.g., 0.8):

$$E^{(n+1)} \leftarrow w_d E^{(n)} \quad (8)$$

In order to avoid abrupt changes in the value of the evidence, the algorithm adds a memory term that weights the past values before updating the evidence (or, equivalently, the algorithm applies a low pass filter to the evidence signal):

$$E^{(n+1)} \leftarrow (1-w_m)E^{(n+1)} + w_m E^{(n)} \quad (9)$$

where $w_m \in [0,1)$ is the weighting factor (e.g., 0.25) with the closer to 0 indicating less importance being given to the past.

Many of the methods in embodiments of the present invention may be performed with an image-capturing system such as a digital processing system (e.g., conventional, general-purpose computer system). Special purpose computers, which are designed or programmed to perform only one function, may also be used.

Figure 8:
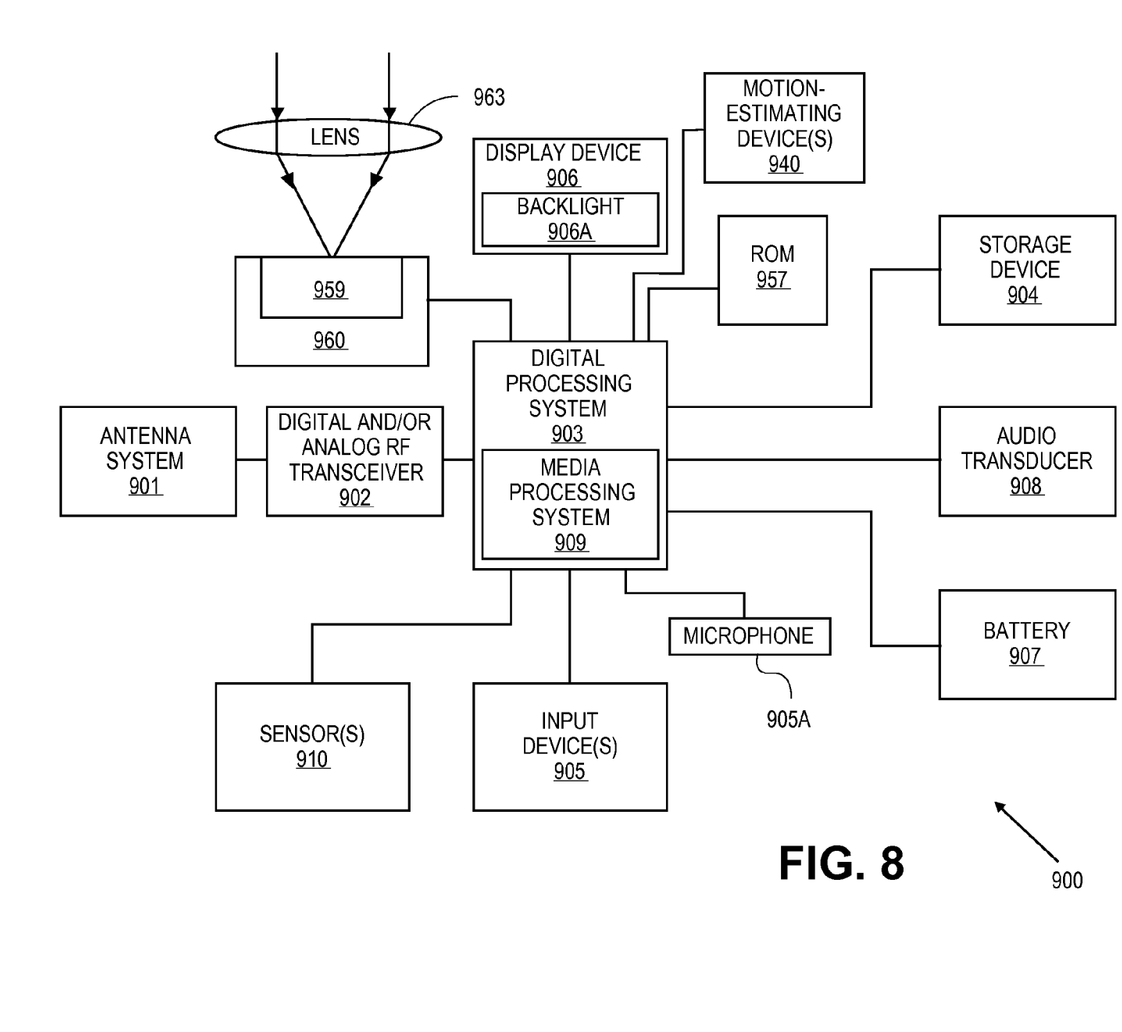
FIG. 8 shows in one embodiment of the present invention a wireless image-capturing device which includes the capability for wireless communication and for capturing images.
Figure 9:
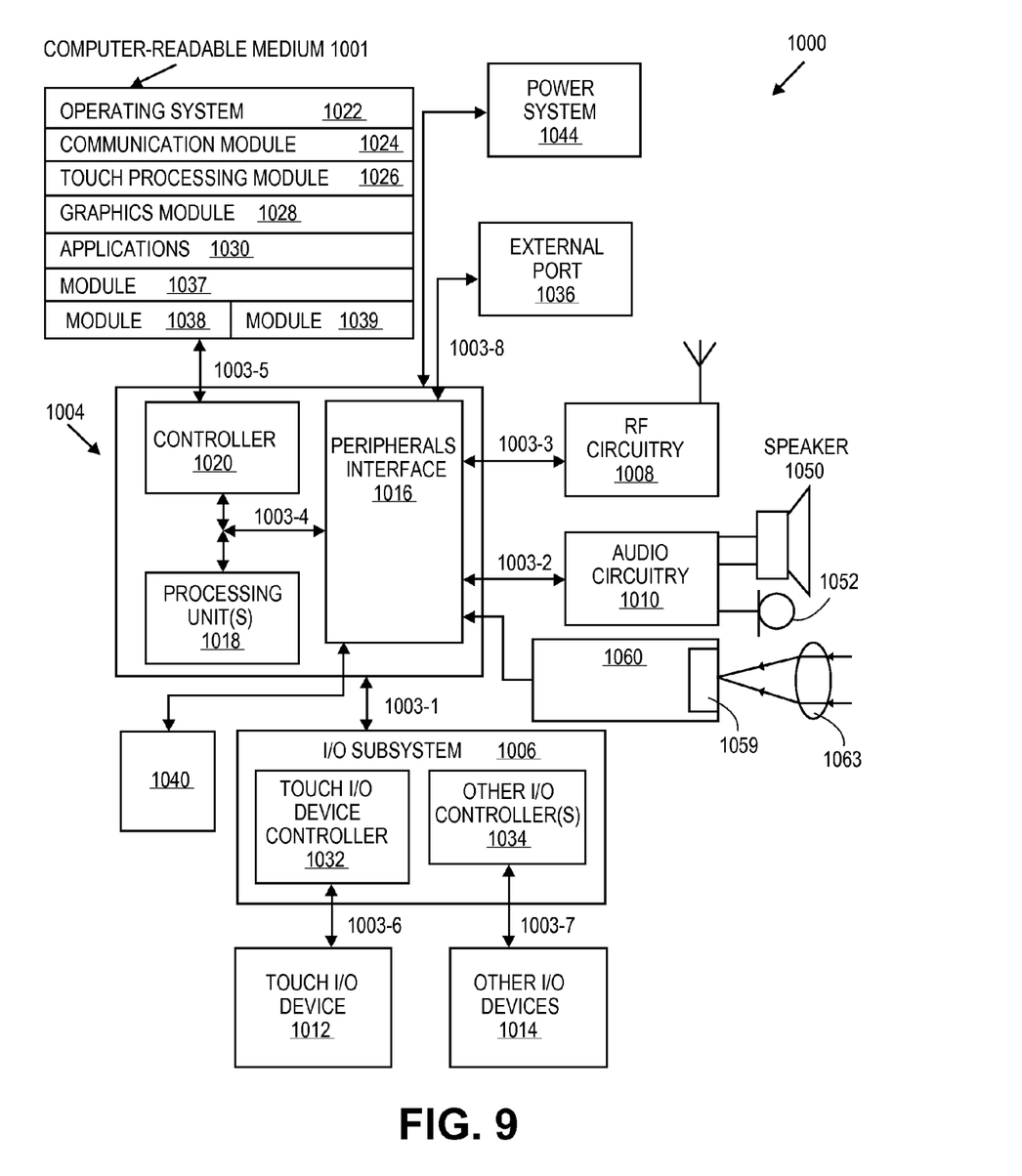
FIG. 9 is a block diagram of one embodiment of the present invention of a system 1000.

In some embodiments, the methods, systems, and apparatuses of the present disclosure can be implemented in various devices including electronic devices, consumer devices, data processing systems, desktop computers, portable computers, wireless devices, cellular devices, tablet devices, handheld devices, multi touch devices, multi touch data processing systems, any combination of these devices, or other like devices. FIGS. 8 and 9 illustrate examples of a few of these devices, which are capable of capturing still images and video to implement the methods of the present disclosure. The methods (e.g., 100, 500, 600) enhance a user experience for panorama applications and other applications by automatically identifying the directionality of a sweep motion performed by a user holding an image-capturing system. The sweep motion is identified by utilizing data provided by motion sensors in the system including a gyroscope and accelerometers. For a panorama application, the direction of the sweep motion is crucial in order to produce seamless and geometrically consistent panoramas within real time constraints since the a-priori knowledge of the type of motion can be used to greatly reduce the amount of computations needed to produce a panorama. In particular, such feature will enhance the user experience since the user will not need to press buttons to indicate the directionality of the motion. This feature will also reduce the clutter of the application graphical user interface.

FIG. 8 shows in one embodiment of the present invention a wireless image-capturing device which includes the capability for wireless communication and for capturing images. Wireless device 900 may include an antenna system 901. Wireless device 900 may also include a digital and/or analog radio frequency (RF) transceiver 902, coupled to the antenna system 901, to transmit and/or receive voice, digital data and/or media signals through antenna system 901.

Wireless device 900 may also include a digital processing system 903 to control the digital RF transceiver and to manage the voice, digital data and/or media signals. Digital processing system 903 may be a general purpose processing system, such as a microprocessor or controller for example. Digital processing system 903 may also be a special purpose processing system, such as an ASIC (application specific integrated circuit), FPGA (field-programmable gate array) or DSP (digital signal processor). Digital processing system 903 may also include other devices, as are known in the art, to interface with other components of wireless device 900. For example, digital processing system 903 may include analog-to-digital and digital-to-analog converters to interface with other components of wireless device 900. Digital processing system 903 may include a media processing system 909, which may also include a general purpose or special purpose processing system to manage media, such as files of audio data.

Wireless device 900 may also include a storage device 904, coupled to the digital processing system, to store data and/or operating programs for the Wireless device 900. Storage device 904 may be, for example, any type of solid-state or magnetic memory device. Storage device 904 may be or include a machine-readable medium.

A machine-readable medium includes any mechanism for storing or transmitting information in a form readable by a machine (e.g., a computer). For example, machines store and communicate (internally and with other devices over a network) code and data using machine-readable media, such as machine storage media (e.g., magnetic disks; optical disks; random access memory; read only memory; flash memory devices; phase-change memory).

Wireless device 900 may also include one or more input devices 905, coupled to the digital processing system 903, to accept user inputs (e.g., telephone numbers, names, addresses, media selections, etc.) Input device 905 may be, for example, one or more of a keypad, a touchpad, a touch screen, a pointing device in combination with a display device or similar input device.

Wireless device 900 may also include at least one display device 906, coupled to the digital processing system 903, to display information such as messages, telephone call information, contact information, pictures, movies and/or titles or other indicators of media being selected via the input device 905. Display device 906 may be, for example, an LCD display device. In one embodiment, display device 906 and input device 905 may be integrated together in the same device (e.g., a touch screen LCD such as a multi-touch input panel which is integrated with a display device, such as an LCD display device). The display device 906 may include a backlight 906A to illuminate the display device 906 under certain circumstances. It will be appreciated that the wireless device 900 may include multiple displays.

Wireless device 900 may also include a battery 907 to supply operating power to components of the system including digital RF transceiver 902, digital processing system 903, storage device 904, input device 905, microphone 905A, audio transducer 908, media processing system 909, sensor(s) 910, and display device 906, an image sensor 959 (e.g., CCD (Charge Coupled Device), CMOS sensor). The image sensor may be integrated with an image processing unit 960. The display device 906 may include a Liquid Crystal Display (LCD) which may be used to display images which are captured or recorded by the wireless image-capturing device 900. The LCD serves as a viewfinder of a camera (e.g., combination of lens 963, image sensor 959, and unit 960) and there may optionally be other types of image display devices on device 900 which can serve as a viewfinder.

The device 900 also includes an imaging lens 963 which can be optically coupled to image sensor 959. The processing system 903 controls the operation of the device 900; and, it may do so by executing a software program stored in ROM 957, or in the processing system 903, or in both ROM 957 and the processing system 903.

The processing system 903 controls the image processing operation; and, it controls the storage of a captured image in storage device 904. The processing system 903 also controls the exporting of image data (which may or may not be color corrected) to an external general purpose computer or special purpose computer.

The processing system 903 also responds to user commands (e.g., a command to "take" a picture or video by capturing image(s) on the image sensor and storing it in memory or a command to select an option for contrast enhancement and color balance adjustment).

The ROM 957 may store software instructions for execution by the processing system 903 to perform the automatic image stabilization and rolling shutter correction mechanisms discussed in the present disclosure. The storage device 904 is used to store captured/recorded images which are received from the image sensor 959. It will be appreciated that other alternative architectures of a camera can be used with the various embodiments of the invention.

Battery 907 may be, for example, a rechargeable or non-rechargeable lithium or nickel metal hydride battery. Wireless device 900 may also include audio transducers 908, which may include one or more speakers, and at least one microphone 905A, and an accelerometer 946. The device 900 also includes a motion or orientation detector 940 (e.g., accelerometer(s), gyroscope, or any combination thereof) for determining motion data or an orientation of the device 900.

In one embodiment, the image-capturing device 900 is designed to determine a direction of a sweep motion of the device based on motion data. The image-capturing device 900 includes the image sensor 959 to sense images, the storage device 904 to store captured images, the motion-estimating device(s) 940 to detect motion data for the device, and the processing system 903 which is coupled to the storage device and the motion-estimating device. The processing system is configured to automatically estimate a first direction of a sweep motion of the image-capturing device based on the motion data, to automatically estimate a second direction of the sweep motion of the image-capturing device based on images captured by the image-capturing device, and to automatically select the first direction or the second direction of the sweep motion. The processing system is further configured to determine a first confidence level associated with the first direction and to determine a second confidence level associated with the second direction. The processing system is further configured to compare the first confidence level and the first direction with the second confidence level and the second direction. The processing system is further configured to select either the first or second direction if the first and second sweep directions match.

FIG. 9 is a block diagram of one embodiment of the present invention of a system 1000 that generally includes one or more computer-readable mediums 1001, processing system 1004, Input/Output (I/O) subsystem 1006, radio frequency (RF) circuitry 1008, audio circuitry 1010, and an image sensor 1059 (e.g., CCD (Charge Coupled Device), CMOS sensor). The image sensor may be integrated with an image processing unit 1060. The image sensor 1059 is optically coupled to receive light from a lens 1063, which can be used for capturing images with the image sensor. Motion-estimating device(s) 1040 determine motion data for the system 1000. These components may be coupled by one or more communication buses or signal lines 1003.

It should be apparent that the architecture shown in FIG. 9 is only one example architecture of system 1000, and that system 1000 could have more or fewer components than shown, or a different configuration of components. The various components shown in FIG. 9 can be implemented in hardware, software, firmware or any combination thereof, including one or more signal processing and/or application specific integrated circuits.

RF circuitry 1008 is used to send and receive information over a wireless link or network to one or more other devices and includes well-known circuitry for performing this function. RF circuitry 1008 and audio circuitry 1010 are coupled to processing system 1004 via peripherals interface 1016. Interface 1016 includes various known components for establishing and maintaining communication between peripherals and processing system 1004. Audio circuitry 1010 is coupled to audio speaker 1050 and microphone 1052 and includes known circuitry for processing voice signals received from interface 1016 to enable a user to communicate in real-time with other users. In some embodiments, audio circuitry 1010 includes a headphone jack (not shown).

Peripherals interface 1016 couples the input and output peripherals of the system to one or more processing units 1018 and computer-readable medium 1001. One or more processing units 1018 communicate with one or more computer-readable mediums 1001 via controller 1020. Computer-readable medium 1001 can be any device or medium (e.g., storage device, storage medium) that can store code and/or data for use by one or more processing units 1018. Medium 1001 can include a memory hierarchy, including but not limited to cache, main memory and secondary memory. The memory hierarchy can be implemented using any combination of RAM (e.g., SRAM, DRAM, DDRAM), ROM, FLASH, magnetic and/or optical storage devices, such as disk drives, magnetic tape, CDs (compact disks) and DVDs (digital video discs). Medium 1001 may also include a transmission medium for carrying information-bearing signals indicative of computer instructions or data (with or without a carrier wave upon which the signals are modulated). For example, the transmission medium may include a communications network, including but not limited to the Internet (also referred to as the World Wide Web), intranet(s), Local Area Networks (LANs), Wide Local Area Networks (WLANs), Storage Area Networks (SANs), Metropolitan Area Networks (MAN) and the like.

One or more processing units 1018 run various software components stored in medium 1001 to perform various functions for system 1000. In some embodiments, the software components include operating system 1022, communication module (or set of instructions) 1024, touch processing module (or set of instructions) 1026, graphics module (or set of instructions) 1028, one or more applications (or set of instructions) 1030, and modules [or set of instructions] 1037-1039. The manager module 1037 receives communications asynchronously from the motion module 1038 and vision module 1039 and makes decisions based on these communications. The modules each correspond to a set of instructions for performing one or more functions described above and the methods described in this application (e.g., the computer-implemented methods and other information processing methods described herein). These modules (i.e., sets of instructions) need not be implemented as separate software programs, procedures or modules, and thus various subsets of these modules may be combined or otherwise rearranged in various embodiments.

In some embodiments, medium 1001 may store a subset of the modules and data structures identified above. Furthermore, medium 1001 may store additional modules and data structures not described above.

Operating system 1022 includes various procedures, sets of instructions, software components and/or drivers for controlling and managing general system tasks (e.g., memory management, storage device control, power management, etc.) and facilitates communication between various hardware and software components.

Communication module 1024 facilitates communication with other devices over one or more external ports 1036 or via RF circuitry 1008 and includes various software components for handling data received from RF circuitry 1008 and/or external port 1036.

Graphics module 1028 includes various known software components for rendering, animating and displaying graphical objects on a display surface. In embodiments in which touch I/O device 1012 is a touch sensitive display (e.g., touch screen), graphics module 1028 includes components for rendering, displaying, and animating objects on the touch sensitive display.

One or more applications 1030 can include any applications installed on system 1000, including without limitation, a panorama application, a browser, address book, contact list, email, instant messaging, word processing, keyboard emulation, widgets, JAVA-enabled applications, encryption, digital rights management, voice recognition, voice replication, location determination capability (such as that provided by the global positioning system (GPS), a music player, etc.

Touch processing module 1026 includes various software components for performing various tasks associated with touch I/O device 1012 including but not limited to receiving and processing touch input received from I/O device 1012 via touch I/O device controller 1032.

System 1000 may include a manager module 1037 digital camera module 1038, panorama module 1039, and image capturing unit 1060 for performing the method/functions as described herein in connection with FIGS. 1-9. The image capturing unit 1060 is integrated with the system 1000 and may be coupled to the peripheral interface 1016 as illustrated in FIG. 9 or integrated with one of the I/O devices 1012 or 1014.

In one embodiment, the computer readable medium 1001 contains executable computer program instructions (e.g., modules 1037-1039) which when executed by the data processing system 1000 cause said system to perform a method. The method automatically determines motion data for an image-capturing device using one or more motion-estimating devices, automatically estimates, with a motion module 1038, a first direction of a sweep motion of the image-capturing device based on the motion data. The method also automatically estimates, with a vision module 1039, a second direction of the sweep motion of the image-capturing device based on visual data captured by the image-capturing device. The method automatically selects, with a manager module 1037, the first direction or the second direction of the image-capturing device.

The method determines a first confidence level associated with the first direction and also determines a second confidence level associated with the second direction. The method compares the first confidence level and the first direction with the second confidence level and the second direction. The method automatically selects either the first or second direction if the first and second sweep directions match. The method automatically selects the first direction if the first and second directions do not match and the first confidence level is greater than the second confidence level and selects the second direction if the first and second directions do not match and the first confidence level is lower than the second confidence level. The motion-estimating device(s) 1040 may include a gyroscope, accelerometer(s), or any combination thereof. The motion module is decoupled from the vision module with the modules asynchronously providing data that indicates the first and the second directions of the sweep motion and the first and second confidence levels to the manager module automatically without user input.

In another embodiment, a computer readable medium contains executable computer program instructions (e.g., modules 1037-1039) which when executed by the data processing system 1000 cause said system to perform a method. The method initiates a panoramic mode for an image-capturing device, captures images with the image-capturing device, and automatically determining a sweep direction of a sweep motion of the image-capturing device. The image-capturing device automatically acquires motion data from motion sensors. The image-capturing device automatically constructs a sweep evidence function, which is used to compute a strength of the sweep motion from sensor values of motion sensors over a period of time. The image-capturing device automatically associates the sweep evidence function to the values coming from motion sensors including an angular evidence function being associated with values from a gyroscope and a linear acceleration evidence function being associated with values from an accelerometer. The image-capturing device automatically determines a direction of sweep motion based on the angular function and the acceleration evidence function.

Modules 1037-1039 may be embodied as hardware, software, firmware, or any combination thereof. Although modules 1037-1039 are shown to reside within medium 1001, all or portions of modules 1037-1039 may be embodied within other components within system 1000 or may be wholly embodied as a separate component within system 1000.

I/O subsystem 1006 is coupled to touch I/O device 1012 and one or more other I/O devices 1014 for controlling or performing various functions. Touch I/O device 1012 communicates with processing system 1004 via touch I/O device controller 1032, which includes various components for processing user touch input (e.g., scanning hardware). One or more other input controllers 1034 receives/sends electrical signals from/to other I/O devices 1014. Other I/O devices 1014 may include physical buttons, dials, slider switches, sticks, keyboards, touch pads, additional display screens, or any combination thereof.

If embodied as a touch screen, touch I/O device 1012 displays visual output to the user in a GUI. The visual output may include text, graphics, video, and any combination thereof. Some or all of the visual output may correspond to user-interface objects. Touch I/O device 1012 forms a touch-sensitive surface that accepts touch input from the user. Touch I/O device 1012 and touch screen controller 1032 (along with any associated modules and/or sets of instructions in medium 1001) detects and tracks touches or near touches (and any movement or release of the touch) on touch I/O device 1012 and converts the detected touch input into interaction with graphical objects, such as one or more user-interface objects. In the case in which device 1012 is embodied as a touch screen, the user can directly interact with graphical objects that are displayed on the touch screen. Alternatively, in the case in which device 1012 is embodied as a touch device other than a touch screen (e.g., a touch pad), the user may indirectly interact with graphical objects that are displayed on a separate display screen embodied as I/O device 1014.

Embodiments in which touch I/O device 1012 is a touch screen, the touch screen may use LCD (liquid crystal display) technology, LPD (light emitting polymer display) technology, OLED (organic LED), or OEL (organic electro luminescence), although other display technologies may be used in other embodiments.

Feedback may be provided by touch I/O device 1012 based on the user's touch input as well as a state or states of what is being displayed and/or of the computing system. Feedback may be transmitted optically (e.g., light signal or displayed image), mechanically (e.g., haptic feedback, touch feedback, force feedback, or the like), electrically (e.g., electrical stimulation), olfactory, acoustically (e.g., beep or the like), or the like or any combination thereof and in a variable or non-variable manner.

System 1000 also includes power system 1044 for powering the various hardware components and may include a power management system, one or more power sources, a recharging system, a power failure detection circuit, a power converter or inverter, a power status indicator and any other components typically associated with the generation, management and distribution of power in portable devices.

In some embodiments, peripherals interface 1016, one or more processing units 1018, and memory controller 1020 may be implemented on a single chip, such as processing system 1004. In some other embodiments, they may be implemented on separate chips. The present disclosure can relate to an apparatus for performing one or more of the operations described herein. This apparatus may be specially constructed for the required purposes, or it may comprise a general purpose computer selectively activated or reconfigured by a computer program stored in the computer. Such a computer program may be stored in a machine (e.g. computer) readable storage medium, such as, but is not limited to, any type of disk including floppy disks, optical disks, CD-ROMs, and magnetic-optical disks, read-only memories (ROMs), random access memories (RAMs), erasable programmable ROMs (EPROMs), electrically erasable programmable ROMs (EEPROMs), flash memory, magnetic or optical cards, or any type of media suitable for storing electronic instructions, and each coupled to a bus.

A machine-readable medium includes any mechanism for storing or transmitting information in a form readable by a machine (e.g., a computer). For example, machines store and communicate (internally and with other devices over a network) code and data using machine-readable media, such as machine storage media (e.g., magnetic disks; optical disks; random access memory; read only memory; flash memory devices; phase-change memory).

In the foregoing specification, the disclosure has been described with reference to specific exemplary embodiments thereof. It will be evident that various modifications may be made thereto without departing from the broader spirit and scope of the disclosure as set forth in the following claims. The specification and drawings are, accordingly, to be regarded in an illustrative sense rather than a restrictive sense.

What is claimed is:

1. A computer implemented method, comprising:
   sensing, with motion sensors of at least one motion-estimating device of an image-capturing system, sensor values during a sweep motion of the image-capturing system;
   determining motion data having a first frequency of sensor values including at least one of acceleration data and angular velocity data using the sensor values of the motion sensors of the at least one motion-estimating device;
   estimating, with a motion module, a first direction of the sweep motion of the image-capturing system and a first confidence level associated with the first direction based on the motion data;
   estimating, with a vision module, a second direction of the sweep motion of the image-capturing system based on visual data having a second frequency of image capture that is associated with images captured at the second frequency by an image-capturing device of the image-capturing system during the sweep motion of the image-capturing system; and
   selecting, with a manager module, the first direction or the second direction of the image-capturing system, wherein the motion module is decoupled from the vision module and the motion module automatically provides the first direction of the sweep motion that is based on the motion data of the motion sensors to the manager module and the vision module automatically provides the second direction of the sweep motion that is based on the visual data to the manager module.

2. The method of claim 1, further comprising:
   determining the first confidence level associated with the first direction; and
   determining a second confidence level associated with the second direction.

3. The method of claim 2, further comprising:
   comparing the first confidence level and the first direction with the second confidence level and the second direction.

4. The method of claim 3, further comprising:
   selecting either the first or second direction if the first and second sweep directions match.

5. The method of claim 3, further comprising:
   selecting the first direction if the first and second directions do not match and the first confidence level is greater than the second confidence level; and
   selecting the second direction if the first and second directions do not match and the first confidence level is lower than the second confidence level.

6. The method of claim 2, wherein the at least one motion-estimating device comprises a gyroscope, an accelerometer, or any combination thereof, wherein the motion module and the vision module asynchronously providing data that indicates the first and the second directions of the sweep motion and the first and second confidence levels to the manager module automatically without user input.

7. A non-transitory computer readable medium containing executable computer program instructions which when executed by a data processing system cause said system to perform a method, the method comprising:
   sensing, with motion sensors of at least one motion-estimating device of the system, sensor values during a sweep motion of the system;
   determining motion data having a first frequency of sensor values including at least one of acceleration data and angular velocity data using the sensor values of the motion sensors of the at least one motion-estimating device;
   estimating, with a motion module, a first sweep direction of the system and a first confidence level associated with the first direction based on the motion data;
   estimating, with a vision module, a second sweep direction of the system based on visual data having a second frequency of image capture that is associated with images captured at the second frequency by an image-capturing device of the system during the sweep motion of the system; and
   selecting, with a manager module, the first sweep direction or the second sweep direction of the system, wherein the motion module is decoupled from the vision module and the motion module automatically provides the first direction of the sweep motion that is based on the motion data of the motion sensors to the manager module and the vision module automatically provides the second direction of the sweep motion that is based on the visual data to the manager module.

8. The medium of claim 7, further comprising:
   determining the first confidence level associated with the first sweep direction; and
   determining a second confidence level associated with the second sweep direction.

9. The medium of claim 8, further comprising:
   comparing the first confidence level and the first sweep direction with the second confidence level and the second sweep direction.

10. The medium of claim 9, further comprising:
    selecting either the first or second sweep direction if the first and second sweep directions match.

11. The medium of claim 9, further comprising:
    selecting the first sweep direction if the first and second sweep directions do not match and the first confidence level is greater than the second confidence level; and
    selecting the second sweep direction if the first and second sweep directions do not match and the first confidence level is lower than the second confidence level.

12. The medium of claim 8, wherein the at least one motion-estimating device comprises a gyroscope, an accelerometer, or any combination thereof, wherein the motion module and the vision module asynchronously providing data that indicates the first and the second directions of the sweep motion and the first and second confidence levels to the manager module automatically without user input.

13. An image-capturing device, comprising:
    an image sensor to capture images;
    a storage device coupled to the image sensor, the storage device to store the captured images;
    at least one motion-estimating device having motion sensors to detect sensor values and determine motion data having a first frequency of sensor values including at least one of acceleration data and angular velocity data using the sensor values; and
    a processing system coupled to the storage device and the at least one motion-estimating device, the processing system is configured to automatically estimate a first direction of a sweep motion of the image-capturing device and a first confidence level associated with the first direction based on the motion data, to automatically estimate a second direction of the sweep motion of the image-capturing device based on the images captured at a second frequency by the image-capturing device, and to automatically select the first direction or the second direction of the sweep motion.

14. The image-capturing device of claim 13, wherein the processing system is further configured to:
   determine the first confidence level associated with the first direction; and
   determine a second confidence level associated with the second direction.

15. The image-capturing device of claim 14, wherein the processing system is further configured to compare the first confidence level and the first direction with the second confidence level and the second direction.

16. The image-capturing device of claim 15, wherein the processing system is further configured to select either the first or second direction if the first and second sweep directions match.

\* \* \* \* \*